3,822,137
Patented July 2, 1974

3,822,137
ORGANIC ARSENIC COMPOUND FOR CREOSOTE FORTIFICATION
Woodrow E. Kemp, Pittsburgh, Pa., assignor to Koppers Company, Inc.
No Drawing. Original application Jan. 26, 1972, Ser. No. 221,080, now Patent No. 3,764,377. Divided and this application July 16, 1973, Ser. No. 379,270
Int. Cl. C09d 3/24
U.S. Cl. 106—15 R                  2 Claims

ABSTRACT OF THE DISCLOSURE

A wood preservative composition comprised of creosote in which is dissolved the novel arsenic-containing compound 1 - (bis(2 - hydroxypropyl)nitriloethylene)-5-arsa-1-aza-4,6-dioxacyclooctyl As-ether whose structure is

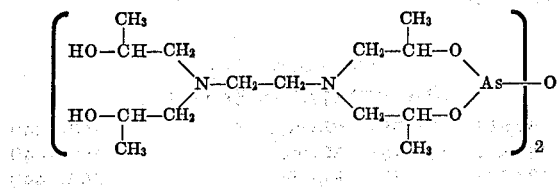

This is a division of application Ser. No. 221,080, filed Jan. 26, 1972, now Pat. No. 3,764,377.

FIELD OF THE INVENTION

This invention relates generally to a wood preservative composition, and in particular to an organic arsenic compound that is soluble in creosote to provide a preservative composition for the treating of wood.

There has now been discovered a novel arsenic organic compound which is soluble in creosote and can be used for the fortification of the creosote, i.e., for the enhancement of the toxic properties of the creosote which is to be used for the impregnation of wood to preserve the wood.

BACKGROUND OF THE INVENTION

Wood being a product of nature is attacked by natural organisms such as insects. A group of chemical compounds which finds widespread use, due to its toxic properties, as a wood preservative, is creosote. Coal-tar creosote is not a single chemical substance but is a mixture containing a great number of aromatic compounds. Such creosote is a distillate of the coal-tar produced by the high temperature carbonization of coal. This distillate begins at about 200° C. and has a continuous boiling range of at least 125° C. and is comprised of liquid and solid aromatic hydrocarbons, contains appreciable quantities of tar acids and tar bases. When the creosote is impregnated into wood, it renders the wood toxic to fungi and most organisms. Still, there are certain organisms which have a tolerance to creosote and will attack lumber which has been treated with creosote.

Another group of compounds that have well-known toxic effects on living organisms are compounds involving arsenic. Some uses of arsenic and its compounds depend upon the chemical and physical properties of arsenic, but the greatest use of arsenic and its compounds depend upon some feature of the toxic properties. Arsenic compounds are poisonous to living organisms and widespread use is made of this characteristic of arsenic compounds in insecticides, fungicides, poisons, and weed killers. Arsenic compounds, however, have peculiarities in solubility characteristic and decomposition characteristic that limit its use many times.

In accordance with this invention, a novel arsenic compound has been found that is compatible with creosote.

Now a wood preservative compound can be formed that includes the toxic qualities of arsenic compounds as well as those of creosote.

SUMMARY OF THE INVENTION

This invention relates generally to wood preservative compositions and more particularly to a solution of 1-(bis(2 - hydroxypropyl)nitriloethylene)-5-arsa-1-aza-4,6-dioxacyclooctyl As-ether in creosote. This novel organic arsenic compound has the general structure

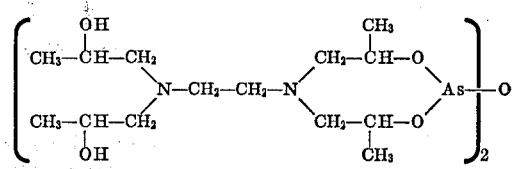

The novel organic arsenic compound is formed by the reaction of arsenous oxide ($As_2O_3$) with N,N,N',N'-tetrakis(2-hydroxypropyl)ethylene diamine.

The N,N,N',N'-tetrakis(2-hydroxypropyl)ethylene diamine is readily available commercially as a viscous, water-white liquid. The arsenic trioxide is a white amorphous powder.

The novel organic arsenic compound is quite soluble in creosote. In parts by weight, for example, 40 parts will dissolve in 100 parts of creosote. The organic arsenic may either be formed separately and added to the creosote or may be formed in situ in the creosote. Forming the organic arsenic compound in situ is advantageous when the solution of the organic arsenic compound is to be used for the impregnation of wood because it then is not necessary to purify the resulting product. The solution of the organic arsenic compound in creosote, a fortified creosote, may be used in the conventional manner as is used creosote for the impregnation of wood.

The wood may be impregnated with a solution of the organic arsenic compound in creosote, the fortified creosote, by either the well-known "empty cell" or "full cell" method to obtain the desired retention of the preservative in the wood. As with creosote, the amount of preservative, fortified creosote, to be placed in the wood will vary with the use to be made of the wood. For example, 4 to 5 pounds of fortified creosote would be retained percubic foot of wood when the wood is to be used, for example, for fence posts. For lighting poles, railroad ties, and the like, the retention, of course, increases to 5 to 12 pounds of fortified creosote per cubic foot of wood. For marine use, of course, even greater retention is required, the retention being 20 to 25 pounds of fortified creosote per cubic foot of wood.

The organic arsenic compound of this invention can, of course, be used to the extent of forming a saturated solution in fortifying the creosote. Normally, a 3–5% by weight of organic arsenic compound in the creosote solution is considered sufficient to provide the additional toxicity to preserve wood against attack by organisms that are tolerant to creosote.

DETAILED DESCRIPTION

The invention will be illustrated more clearly by the following examples.

EXAMPLE I

Two hundred sixty-five grams of N,N,N',N'-tetrakis (2-hydroxypropyl)ethylene diamine is charged to a 1 liter stirred flask equipped with a water trap. Fifty grams of xylene is added, the mixture heated to 125° C. and then 215 grams of arsenic trioxide is added over a period of 5 minutes. The mixture is refluxed for 1½ hours at 107 to 123° C. and the water evolved from the compound formation is collected in the trap (16.4 ml.). The viscous product mixture is cooled to room temperature and this new composition of matter is purified by acetone extraction. The purified compound is pale tan colored solid melting at 52 to 54° C.

Based on a molecular weight of 746, an elemental arsenic content of 20.2 (theory 20.1), an As-O band at 15.9 microns, and NMR analysis, the structural formula of the compound is:

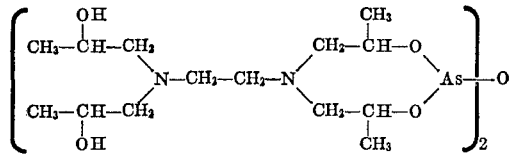

The solubility if the compound in creosote is 40 grams of compound per 100 grams of creosote.

EXAMPLE II

To 10,000 grams of creosote was added 265 grams of N,N,N',N'-tetrakis(2 - hydroxypropyl)ethylene diamine. The mixture is placed in a stir reactor and heated to 125° C., then a 215 grams of arsenic trioxide is added over a period of 5 minutes. The mixture is heated to 125° C. and kept under agitation for a period of 2 hours. The arsenic trioxide solid disappears as the reaction proceeds to form the novel compound, 1 - (bis(2 - hydroxypropyl)nitriloethylene) - 5 - arsa - 1 - aza - 4,6 - dioxacyclooctyl As-ether in situ.

The advantage of this in situ prepartion is that the fortified creosote is produced without further treatment. The N,N,N',N'-tetrakis(2 - hydroxypropyl)ethylene diamine is soluble in the creosote, but the arsenic trioxide is not. However, disappearance of the solids as the reaction proceeds permits the operation to determine completion of the organic reaction as the arsenic compound of the invention is formed.

The foregoing has described a novel organic arsenic compound which can be used for the fortification of creosote for the preservation of lumber. The fortified creosote can be formed by the organic arsenic compound either being synthesized and then added to the creosote, or the compound being made in situ in a creosote medium. The novel fortified creosote can be used in conventional equipment for the impregnation of lumber.

What is claimed is:

1. A wood preservative composition comprised of creosote having dissolved therein 1-(bis(2 - hydroxypropyl) nitriloethylene)-5-arsa-1-aza-4,6-dioxacyclooctyl As-ether.

2. A solution comprised of creosote and the compound represented by the structure

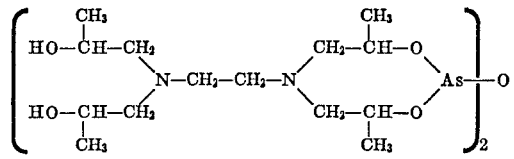

References Cited
UNITED STATES PATENTS

| | | | |
|---|---|---|---|
| 3,109,853 | 11/1963 | Worsley | 260—440 |
| 3,158,637 | 11/1963 | Marks | 260—440 |
| 3,299,173 | 1/1967 | Roselli | 260—440 |

ALLAN LIEBERMAN, Primary Examiner

P. R. MICHL, Assistant Examiner

U.S. Cl. X.R.

106—273 N, 278, 15 AF